US006937586B2

(12) United States Patent
Asokan

(10) Patent No.: US 6,937,586 B2
(45) Date of Patent: Aug. 30, 2005

(54) SCANNING PROCEDURE FOR EDGE COMPACT SYSTEM

(75) Inventor: Ramanathan Asokan, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1030 days.

(21) Appl. No.: 09/814,513

(22) Filed: Mar. 22, 2001

(65) Prior Publication Data

US 2002/0136180 A1 Sep. 26, 2002

(51) Int. Cl.⁷ .................................................. H04J 3/00
(52) U.S. Cl. ..................................... 370/337; 370/321
(58) Field of Search .............................. 370/337, 321, 370/318, 508, 480, 347, 335; 375/135

(56) References Cited

U.S. PATENT DOCUMENTS

| | | | | |
|---|---|---|---|---|
| 5,933,418 A | * | 8/1999 | Massingill et al. | 370/321 |
| 6,084,865 A | * | 7/2000 | Dent | 370/321 |
| 6,101,176 A | * | 8/2000 | Honkasalo et al. | 370/335 |
| 6,366,602 B1 | * | 4/2002 | Raitola | 375/135 |
| 6,600,758 B1 | * | 7/2003 | Mazur et al. | 370/508 |
| 6,804,262 B1 | * | 10/2004 | Vogel et al. | 370/480 |
| 6,829,226 B1 | * | 12/2004 | Apostolides et al. | 370/318 |

OTHER PUBLICATIONS

"Issues with respect to Initial Selection Time for 200 kHz Standalone Classic/Compact," Ericsson, Inc., UWCC/PDFG/99.11.02, Nov. 2, 1999.

U.S. Appl. No. 09/704,163 filed Nov. 1, 2000 entitled "Channel Selection Method".

* cited by examiner

Primary Examiner—Chi Pham
Assistant Examiner—Prenell Jones
(74) Attorney, Agent, or Firm—Coats & Bennett, P.L.L.C.

(57) ABSTRACT

A channel selection method is implemented by a mobile terminal in a time division multiple access system. The mobile terminal performs a plurality of repetitive power measurements on each of a plurality of carriers over a plurality of successive power measurement windows. During each power measurement window, one power measurement is taken on each carrier. The power measurements are repeated a predetermined number of times on each carrier, each repeated power measurement being taken in a different power measurement window. The power measurement on a given carrier is taken at the same relative position within each power measurement window, which comprises on frame plus one slot of a TDMA multi-frame.

30 Claims, 10 Drawing Sheets

FRAMES 0-51 OF A 208-MULTIFRAME
(N MOD 4 = 0)
TIME GROUP 1

| TS FRAME | 0 | 1 | 2 | 3 | 4 | 5 | 6 | 7 |
|---|---|---|---|---|---|---|---|---|
| 0 | | BCCH | | IDLE | | IDLE | | IDLE |
| 1 | | BCCH | | IDLE | | IDLE | | IDLE |
| 2 | | BCCH | | IDLE | | IDLE | | IDLE |
| 3 | | BCCH | | IDLE | | IDLE | | IDLE |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | PTCCH | | | | | | |
| 13 | | IDLE | | IDLE | | IDLE | | CCCH |
| 14 | | IDLE | | IDLE | | IDLE | | CCCH |
| 15 | | IDLE | | IDLE | | IDLE | | CCCH |
| 16 | | IDLE | | IDLE | | IDLE | | CCCH |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | IDLE | | | | | | FCCH |
| 26 | | IDLE | | IDLE | | IDLE | | CCCH |
| 27 | | IDLE | | IDLE | | IDLE | | CCCH |
| 28 | | IDLE | | IDLE | | IDLE | | CCCH |
| 29 | | IDLE | | IDLE | | IDLE | | CCCH |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | | | | | | | | |
| 38 | | PTCCH | | | | | | |
| 39 | | IDLE | | IDLE | | IDLE | | CCCH |
| 40 | | IDLE | | IDLE | | IDLE | | CCCH |
| 41 | | IDLE | | IDLE | | IDLE | | CCCH |
| 42 | | IDLE | | IDLE | | IDLE | | CCCH |
| 43 | | | | | | | | |
| 44 | | | | | | | | |
| 45 | | | | | | | | |
| 46 | | | | | | | | |
| 47 | | | | | | | | |
| 48 | | | | | | | | |
| 49 | | | | | | | | |
| 50 | | | | | | | | |
| 51 | | IDLE | | | | | | SCH |

*FIG 4A*

FRAMES 0-51 OF A 208-MULTIFRAME
(N MOD 4 = 0)
TIME GROUP 2

| TS FRAME | 0 | 1 | 2 | 3 | 4 | 5 | 6 | 7 |
|---|---|---|---|---|---|---|---|---|
| 0 |  | IDLE |  | BCCH |  | IDLE |  | IDLE |
| 1 |  | IDLE |  | BCCH |  | IDLE |  | IDLE |
| 2 |  | IDLE |  | BCCH |  | IDLE |  | IDLE |
| 3 |  | IDLE |  | BCCH |  | IDLE |  | IDLE |
| 4 |  |  |  |  |  |  |  |  |
| 5 |  |  |  |  |  |  |  |  |
| 6 |  |  |  |  |  |  |  |  |
| 7 |  |  |  |  |  |  |  |  |
| 8 |  |  |  |  |  |  |  |  |
| 9 |  |  |  |  |  |  |  |  |
| 10 |  |  |  |  |  |  |  |  |
| 11 |  |  |  |  |  |  |  |  |
| 12 |  |  |  | PTCCH |  |  |  |  |
| 13 |  | CCCH |  | IDLE |  | IDLE |  | IDLE |
| 14 |  | CCCH |  | IDLE |  | IDLE |  | IDLE |
| 15 |  | CCCH |  | IDLE |  | IDLE |  | IDLE |
| 16 |  | CCCH |  | IDLE |  | IDLE |  | IDLE |
| 17 |  |  |  |  |  |  |  |  |
| 18 |  |  |  |  |  |  |  |  |
| 19 |  |  |  |  |  |  |  |  |
| 20 |  |  |  |  |  |  |  |  |
| 21 |  |  |  |  |  |  |  |  |
| 22 |  |  |  |  |  |  |  |  |
| 23 |  |  |  |  |  |  |  |  |
| 24 |  |  |  |  |  |  |  |  |
| 25 | IDLE | FCCH |  | IDLE |  |  |  |  |
| 26 |  | CCCH |  | IDLE |  | IDLE |  | IDLE |
| 27 |  | CCCH |  | IDLE |  | IDLE |  | IDLE |
| 28 |  | CCCH |  | IDLE |  | IDLE |  | IDLE |
| 29 |  | CCCH |  | IDLE |  | IDLE |  | IDLE |
| 30 |  |  |  |  |  |  |  |  |
| 31 |  |  |  |  |  |  |  |  |
| 32 |  |  |  |  |  |  |  |  |
| 33 |  |  |  |  |  |  |  |  |
| 34 |  |  |  |  |  |  |  |  |
| 35 |  |  |  |  |  |  |  |  |
| 36 |  |  |  |  |  |  |  |  |
| 37 |  |  |  |  |  |  |  |  |
| 38 |  |  |  | PTCCH |  |  |  |  |
| 39 |  | CCCH |  | IDLE |  | IDLE |  | IDLE |
| 40 |  | CCCH |  | IDLE |  | IDLE |  | IDLE |
| 41 |  | CCCH |  | IDLE |  | IDLE |  | IDLE |
| 42 |  | CCCH |  | IDLE |  | IDLE |  | IDLE |
| 43 |  |  |  |  |  |  |  |  |
| 44 |  |  |  |  |  |  |  |  |
| 45 |  |  |  |  |  |  |  |  |
| 46 |  |  |  |  |  |  |  |  |
| 47 |  |  |  |  |  |  |  |  |
| 48 |  |  |  |  |  |  |  |  |
| 49 |  |  |  |  |  |  |  |  |
| 50 |  |  |  |  |  |  |  |  |
| 51 | IDLE | SCH |  | IDLE |  |  |  |  |

*FIG 4B*

FRAMES 0-51 OF A 208-MULTIFRAME
(N MOD 4 = 0)
TIME GROUP 3

| TS FRAME | 0 | 1 | 2 | 3 | 4 | 5 | 6 | 7 |
|---|---|---|---|---|---|---|---|---|
| 0 |  | IDLE |  | IDLE |  | BCCH |  | IDLE |
| 1 |  | IDLE |  | IDLE |  | BCCH |  | IDLE |
| 2 |  | IDLE |  | IDLE |  | BCCH |  | IDLE |
| 3 |  | IDLE |  | IDLE |  | BCCH |  | IDLE |
| 4 |  |  |  |  |  |  |  |  |
| 5 |  |  |  |  |  |  |  |  |
| 6 |  |  |  |  |  |  |  |  |
| 7 |  |  |  |  |  |  |  |  |
| 8 |  |  |  |  |  |  |  |  |
| 9 |  |  |  |  |  |  |  |  |
| 10 |  |  |  |  |  |  |  |  |
| 11 |  |  |  |  |  |  |  |  |
| 12 |  | PTCCH | | | | | | |
| 13 |  | IDLE |  | CCCH |  | IDLE |  | IDLE |
| 14 |  | IDLE |  | CCCH |  | IDLE |  | IDLE |
| 15 |  | IDLE |  | CCCH |  | IDLE |  | IDLE |
| 16 |  | IDLE |  | CCCH |  | IDLE |  | IDLE |
| 17 |  |  |  |  |  |  |  |  |
| 18 |  |  |  |  |  |  |  |  |
| 19 |  |  |  |  |  |  |  |  |
| 20 |  |  |  |  |  |  |  |  |
| 21 |  |  |  |  |  |  |  |  |
| 22 |  |  |  |  |  |  |  |  |
| 23 |  |  |  |  |  |  |  |  |
| 24 |  |  |  |  |  |  |  |  |
| 25 |  | IDLE |  | FCCH |  | IDLE | | |
| 26 |  | IDLE |  | CCCH |  | IDLE |  | IDLE |
| 27 |  | IDLE |  | CCCH |  | IDLE |  | IDLE |
| 28 |  | IDLE |  | CCCH |  | IDLE |  | IDLE |
| 29 |  | IDLE |  | CCCH |  | IDLE |  | IDLE |
| 30 |  |  |  |  |  |  |  |  |
| 31 |  |  |  |  |  |  |  |  |
| 32 |  |  |  |  |  |  |  |  |
| 33 |  |  |  |  |  |  |  |  |
| 34 |  |  |  |  |  |  |  |  |
| 35 |  |  |  |  |  |  |  |  |
| 36 |  |  |  |  |  |  |  |  |
| 37 |  |  |  |  |  |  |  |  |
| 38 |  | PTCCH | | | | | | |
| 39 |  | IDLE |  | CCCH |  | IDLE |  | IDLE |
| 40 |  | IDLE |  | CCCH |  | IDLE |  | IDLE |
| 41 |  | IDLE |  | CCCH |  | IDLE |  | IDLE |
| 42 |  | IDLE |  | CCCH |  | IDLE |  | IDLE |
| 43 |  |  |  |  |  |  |  |  |
| 44 |  |  |  |  |  |  |  |  |
| 45 |  |  |  |  |  |  |  |  |
| 46 |  |  |  |  |  |  |  |  |
| 47 |  |  |  |  |  |  |  |  |
| 48 |  |  |  |  |  |  |  |  |
| 49 |  |  |  |  |  |  |  |  |
| 50 |  |  |  |  |  |  |  |  |
| 51 |  | IDLE |  | SCH |  | IDLE | | |

*FIG 4C*

FRAMES 0-51 OF A 208-MULTIFRAME
(N MOD 4 = 0)
TIME GROUP 4

| TS FRAME | 0 | 1 | 2 | 3 | 4 | 5 | 6 | 7 |
|---|---|---|---|---|---|---|---|---|
| 0 | | IDLE | | IDLE | | IDLE | | BCCH |
| 1 | | IDLE | | IDLE | | IDLE | | BCCH |
| 2 | | IDLE | | IDLE | | IDLE | | BCCH |
| 3 | | IDLE | | IDLE | | IDLE | | BCCH |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | PTCCH | | | | |
| 13 | | IDLE | | IDLE | | CCCH | | IDLE |
| 14 | | IDLE | | IDLE | | CCCH | | IDLE |
| 15 | | IDLE | | IDLE | | CCCH | | IDLE |
| 16 | | IDLE | | IDLE | | CCCH | | IDLE |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | | | IDLE | | FCCH | | IDLE |
| 26 | | IDLE | | IDLE | | CCCH | | IDLE |
| 27 | | IDLE | | IDLE | | CCCH | | IDLE |
| 28 | | IDLE | | IDLE | | CCCH | | IDLE |
| 29 | | IDLE | | IDLE | | CCCH | | IDLE |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | | | | | | | | |
| 38 | | | | PTCCH | | | | |
| 39 | | IDLE | | IDLE | | CCCH | | IDLE |
| 40 | | IDLE | | IDLE | | CCCH | | IDLE |
| 41 | | IDLE | | IDLE | | CCCH | | IDLE |
| 42 | | IDLE | | IDLE | | CCCH | | IDLE |
| 43 | | | | | | | | |
| 44 | | | | | | | | |
| 45 | | | | | | | | |
| 46 | | | | | | | | |
| 47 | | | | | | | | |
| 48 | | | | | | | | |
| 49 | | | | | | | | |
| 50 | | | | | | | | |
| 51 | | | | IDLE | | SCH | | IDLE |

*FIG 4D*

FRAMES 0-51 OF A 208-MULTIFRAME
(N MOD 4 = 0)
TIME GROUP 1

| TS FRAME | 0 | 1 | 2 | 3 | 4 | 5 | 6 | 7 |
|---|---|---|---|---|---|---|---|---|
| 0 | | ░ | | | | | | |
| 1 | | ░ | | | | | | |
| 2 | | ░ | | | | | | |
| 3 | | ░ | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | ░ |
| 14 | | | A | B | C | D | E | ░F |
| 15 | G | H | I | A | B | C | D | ░E |
| 16 | F | G | H | I | A | B | C | ░D |
| 17 | E | F | G | H | I | A | B | C |
| 18 | D | E | F | G | H | I | A | B |
| 19 | C | D | E | F | G | H | I | A |
| 20 | B | C | D | E | F | G | H | I |
| 21 | A | B | C | D | E | F | G | H |
| 22 | I | A | B | C | D | E | F | G |
| 23 | H | I | A | B | C | D | E | F |
| 24 | G | H | I | A | B | C | D | E |
| 25 | F | G | H | I | A | B | C | ░D |
| 26 | E | F | G | H | I | A | B | ░C |
| 27 | D | E | F | G | H | I | A | ░B |
| 28 | C | D | E | F | G | H | I | ░A |
| 29 | B | C | D | E | F | G | H | ░I |
| 30 | A | B | C | D | E | F | G | H |
| 31 | I | A | B | C | D | E | F | G |
| 32 | H | I | A | B | C | D | E | F |
| 33 | G | H | I | A | B | C | D | E |
| 34 | F | G | H | I | A | B | C | D |
| 35 | E | F | G | H | I | A | B | C |
| 36 | D | E | F | G | H | I | A | B |
| 37 | C | D | E | F | G | H | I | A |
| 38 | B | C | D | E | F | G | H | I |
| 39 | A | B | C | D | E | F | G | ░H |
| 40 | I | | | | | | | ░ |
| 41 | | | | | | | | ░ |
| 42 | | | | | | | | ░ |
| 43 | | | | | | | | |
| 44 | | | | | | | | |
| 45 | | | | | | | | |
| 46 | | | | | | | | |
| 47 | | | | | | | | |
| 48 | | | | | | | | |
| 49 | | | | | | | | |
| 50 | | | | | | | | |
| 51 | | | | | | | | ░ |

ONE POWER MEASUREMENT SET = 26 FRAMES (rows 14–39)

FIG 5

SCANNING PROCEDURE FOR EDGE COMPACT SYSTEM

BACKGROUND OF THE INVENTION

The present invention relates in general to mobile wireless communication systems, and more particularly, to a scanning procedure for an EDGE Compact system.

Enhanced Data Rates for Global Evolution (EDGE) is an evolution of the Global System for Mobile Communications (GSM) standard and the Telecommunications Industry Association (TIA)/Electronic Industry Association (EIA) standard TIA/EIA-136 for Time Division Multiple Access (TDMA) systems that allows high rate packet data capability. There are two modes in which EDGE can be deployed, EDGE Classic, which is similar to the way EDGE is deployed in GSM systems, and an enhanced mode called EDGE Compact. EDGE Compact requires less than 1 MHz of spectrum for deployment while EDGE Classic requires 2.4 MHz of spectrum. In either case, when a mobile terminal is switched on, it is important for it to obtain service as soon as possible. For this to happen, the mobile terminal needs to read the broadcast information transmitted by the system, following which it can make a random access and register with the system. This process is described in the GSM specification, published by the European Telecommunications Standards Institute (ETSI), which deals with Radio Subsystem Link Control.

In EDGE Classic, carriers with broadcast and common control information, called BCCH carriers, are transmitted continuously with constant power, whereas other carriers may have power variations and power off conditions at different times. Thus, the channel selection procedure to find BCCH carriers as specified in the GSM standard requires the mobile terminal to do the following:

1. Measure power on all carriers at random times;
2. Average at least five of these measurements per carrier over a range of 3–5 seconds;
3. Choose the carriers with the highest average power as candidates to search for control channels.

However, the channel selection procedure described in the GSM standard is not appropriate for EDGE Compact since the carriers with the broadcast information (called EDGE Compact primary carriers) do not transmit continuously or at a constant power level. Only the time slots with control information are required to be transmitted at maximum power, and the rest of the time slots can transmit with less than maximum power or may be idle. Thus, random measurements of signal strength have to be modified in order to make sure that a sufficient number of valid measurements are obtained, or new methods that do not rely on the such constant power level requirements need to be defined.

BRIEF SUMMARY OF THE INVENTION

The present invention relates to a channel selection method implemented by a mobile terminal in a time division multiple access (TDMA) system where the carrier containing the broadcast control channel may include idle slots or where the power level is not constant. At power up, the mobile terminal attempts to find a channel on which to acquire service by performing a series of power measurements. In conventional TDMA systems, the mobile terminal performs a series of power measurements on the available carriers to find one or more control channels, and then selects a control channel on which to acquire service. In EDGE Compact systems the control channel is not transmitted continuously so the method of performing power measurements needs to take the discontinuous transmission of control information into account. The present invention provides a channel selection method particularly adapted for a system that transmits control information discontinuously.

The present invention uses a sliding power measurement window to perform repetitive power measurements on a plurality of carriers. The power measurement window comprises one frame of a TDMA multi-frame plus one slot. Repetitive power measurements are made on each one of a plurality of carriers in m successive instances of the sliding power measurement window to complete one power measurement set. The mobile terminal begins by measuring the signal strength of a given carrier at any slot position in a power measurement window. The next power measurement on the same carrier is performed at the same slot position of the next power measurement window. This process is repeated until a predetermined number of power measurements are taken on the carrier. Since each successive power measurement window shifts right one slot relative to the start of a frame, successive power measurements on the same carrier likewise shift one slot right in modulo fashion after each measurement. This process makes it likely that at least one power measurement on each carrier occurs in each slot position in a frame. The number of repetitive power measurements on each carrier is chosen to ensure a specified probability of at least one such measurement coinciding with a control channel slot (i.e., a valid measurement). The strongest power measurement after a predetermined number of repetitive measurements is taken as a valid power measurement for that carrier. This entire process is then repeated to obtain additional power measurements for that carrier, which may be averaged to obtain an average power measurement for the carrier.

Only one power measurement is taken on one carrier over one power measurement window, which is one frame plus one slot. The power measurement window is subdivided into k sub-windows. Each sub-window is the time needed by the mobile terminal to switch carriers and make one power measurement. Thus, during each successive power measurement window, the mobile terminal can take power measurements on up to k carriers. Therefore, after m successive power measurement windows (where m is the number of repetitions in a power measurement set on a carrier), the mobile terminal will save the highest power measurement for each of the k carriers. This entire process may then be repeated n times to obtain n power measurements for k carriers.

After performing the power measurements as described above, the mobile terminal averages a selected number of the highest power measurements for each carrier to obtain an average power for each carrier. For example, if the mobile terminal collects six power measurements for each carrier, the mobile terminal may average the four or five highest power measurements to obtain an average power measurement for each carrier. Omitting one or more power measurements from the average is done because there is a small probability that one such power measurement is not valid, in which case the invalid measurement does not lower the average. The mobile terminal then selects a plurality of candidate carriers by choosing those with the highest average power. Once the candidate carriers are identified, the mobile terminal selects one of the candidate carriers on which to acquire service, synchronizes to the broadcast control channel, reads the information on the broadcast control channel, and then registers with the network.

BRIEF DESCRIPTION OF THE DRAWINGS

FIGS. 4A–4D are diagrams illustrating the frame structure of an EDGE Compact primary carrier used by the exemplary wireless communications system of FIG. 1.

FIG. 5 is a diagram illustrating how the power measurements are made in one illustrative embodiment of the present invention.

DETAILED DESCRIPTION OF THE INVENTION

Figure 1:
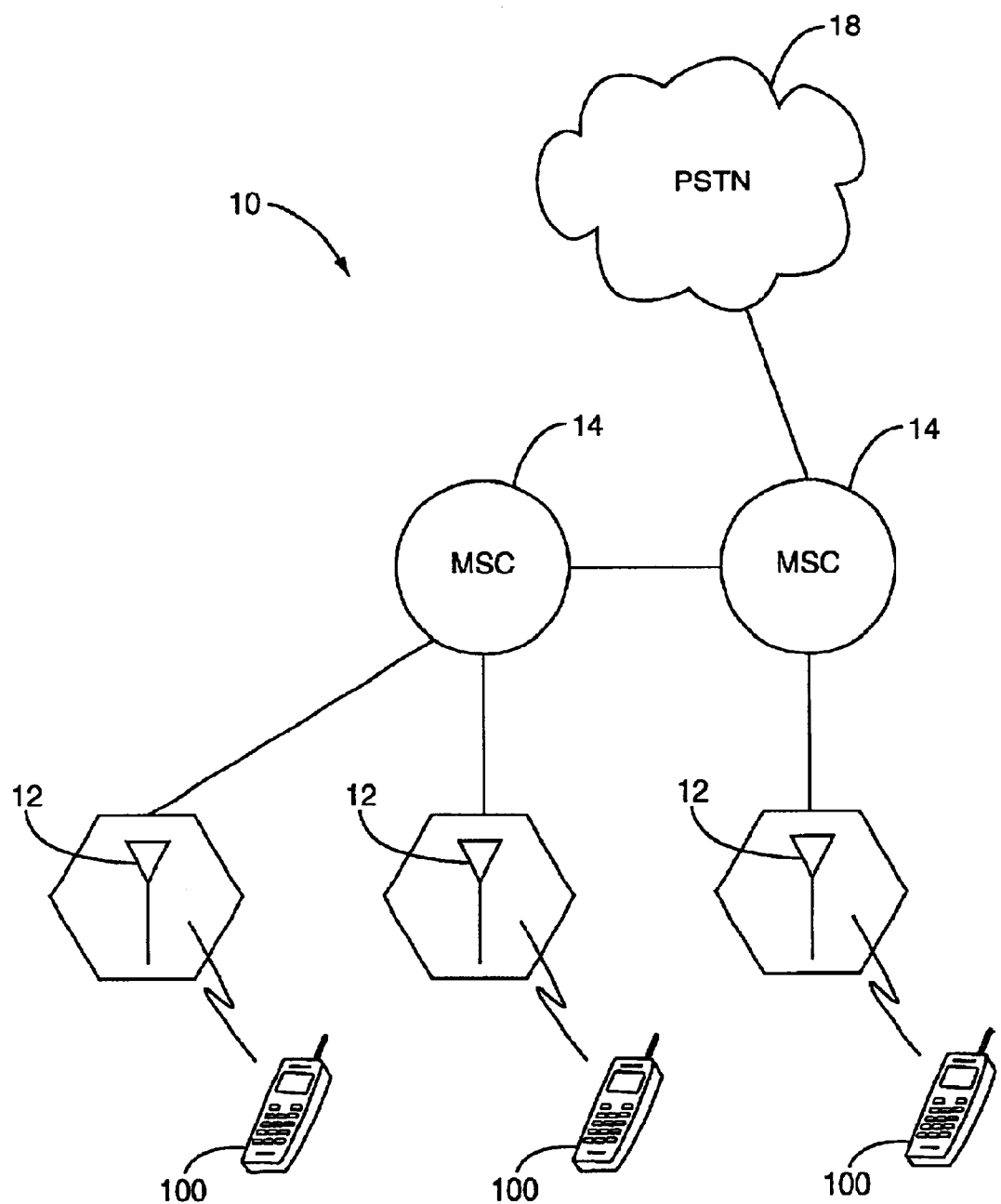
FIG. 1 is a network diagram illustrating an exemplary wireless communications system.

The present invention is described in the context of a wireless communications system 10 shown schematically in FIG. 1. The wireless communications system 10 implements the Global System for Mobile Communications (GSM) standard published by the European Telecommunications Standards Institute (ETSI). More particularly, the wireless communications system 10 implements the variant of GSM known as Enhanced Data Rates for Global Evolution (EDGE) Compact. Those skilled in the art will appreciate, however, that the present invention may be used for other types of wireless communication systems and access protocols, such as the Telecommunications Industry Association/Electronics Industry Association (TIA/EIA) standard TIA/EIA-136.

The wireless communications system 10 comprises a plurality of mobile terminals 100 and base stations 12, and one or more mobile switching centers (MSCs) 14. Each base station 12 is located in and provides services to a geographic region referred to as a cell. In general, there is one base station 12 for each cell within a given wireless communications system 10. Within each cell, there may be a plurality of mobile terminals 100 that communicate via radio link with the serving base station 12. Base stations 12 connect via one or more MSCs 14 to external wireline networks 18, such as the Public Switched Telephone Network (PSTN), the Integrated Services Digital Network (ISDN), and/or the Internet. At least one MSC 14 may serve as a gateway to the external wireline network 18 or to other Public Land Mobile Networks (PLMNs). The MSC 14 routes calls to and from the mobile terminal 100 through the appropriate base station 12.

Figure 2:
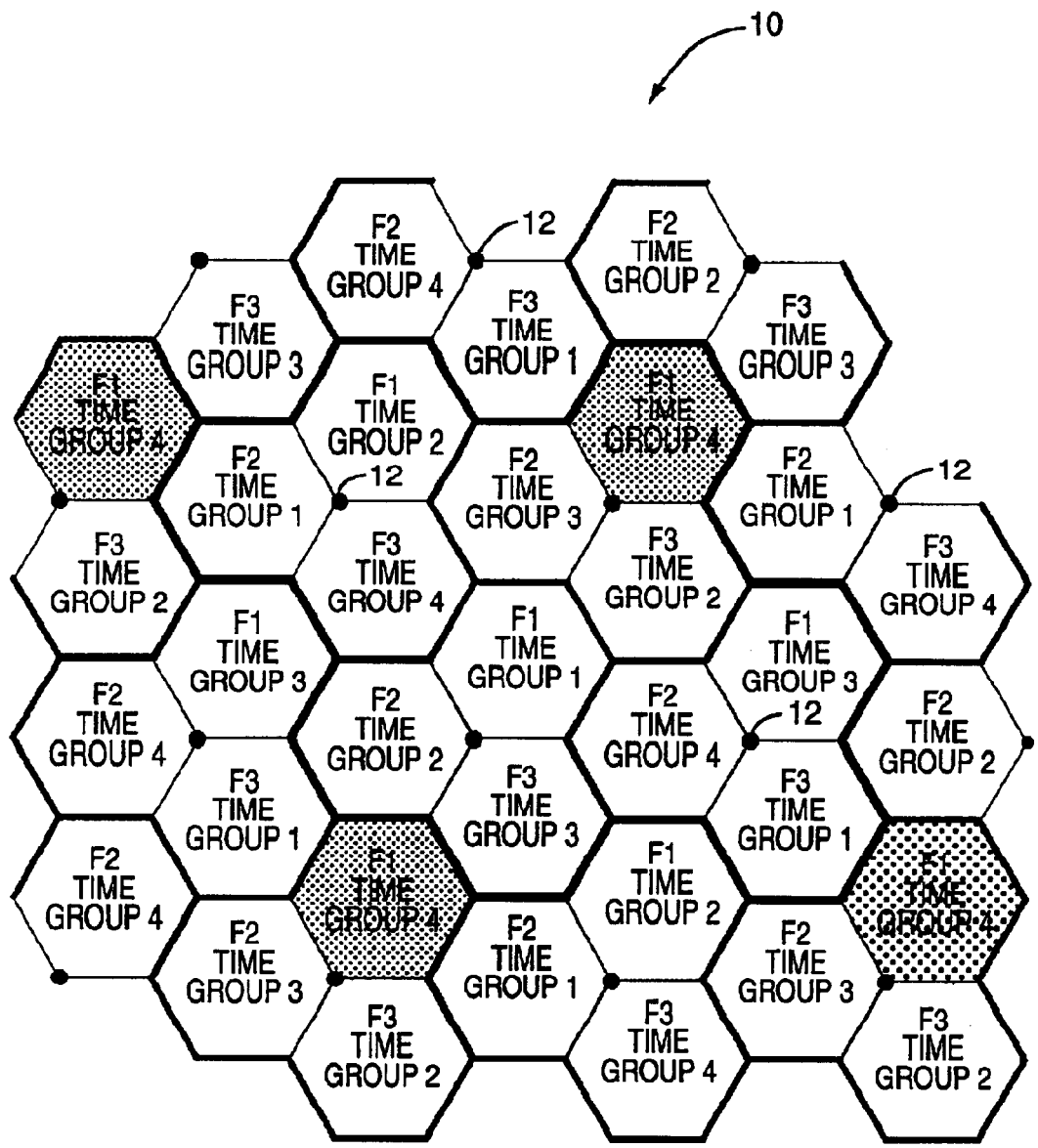
FIG. 2 is a cell frequency and time group plan for the exemplary wireless communications system of FIG. 1.

FIG. 2 is a cell plan for the wireless communications system 10 implementing the EDGE Compact standard which employs time and frequency reuse. Each cell comprises three sectors (represented as hexagons in FIG. 2), which are typically served by a single base station 12. Each base station 12 is allocated at least three carrier frequency groups; one for each sector. The carrier frequency groups are reused in each sector using a ⅓ frequency reuse pattern as shown in FIG. 2. The carrier frequency groups may comprise one or more carrier frequencies.

Figure 3:
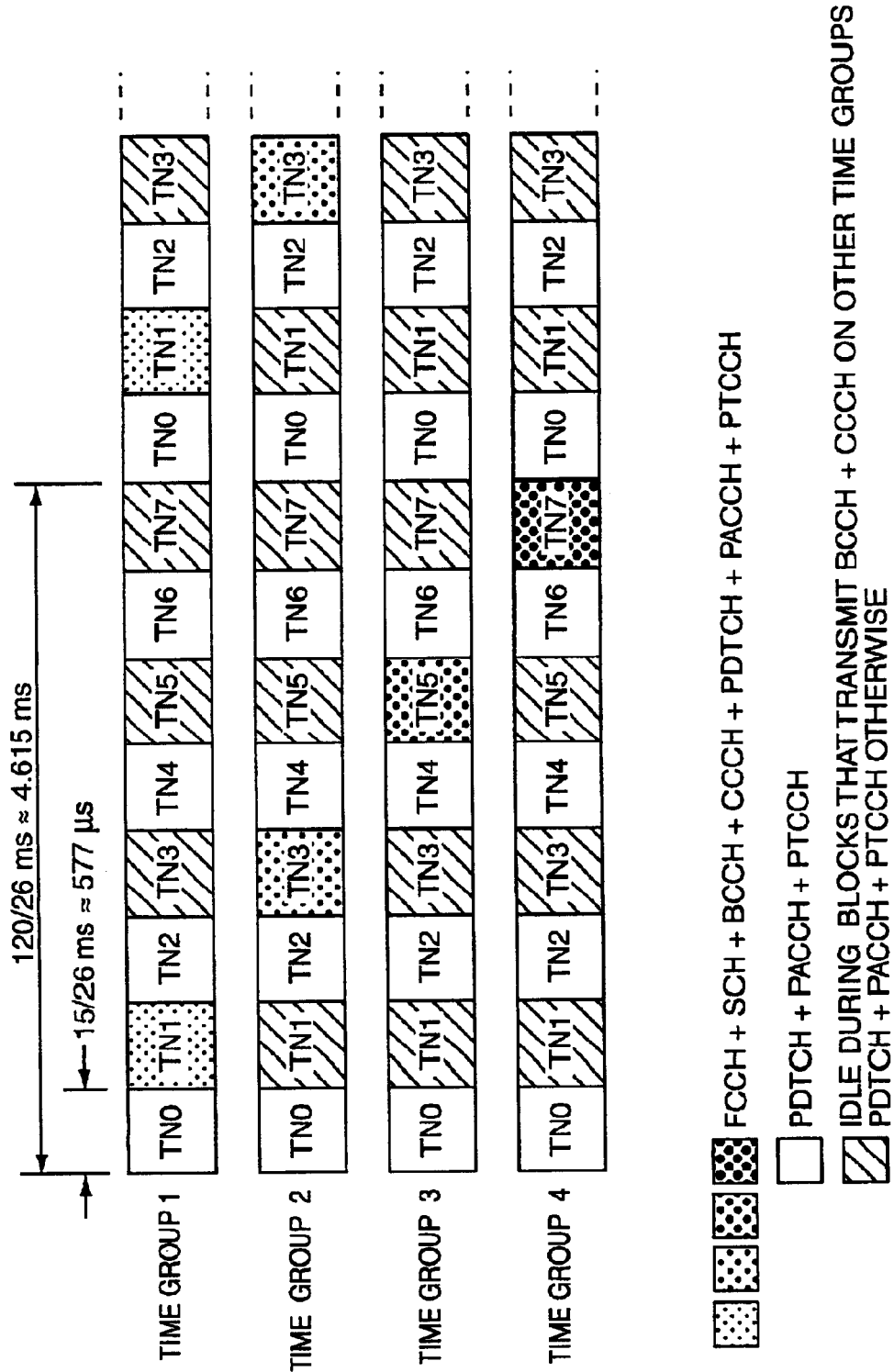
FIG. 3 is a diagram illustrating the frame structure used by the exemplary wireless communications system of FIG. 1.

Each carrier frequency is subdivided into frames, and each frame is further subdivided into eight time slots, as shown in FIG. 3. The frames are approximately 4.6 ms in length. The time slots are approximately 0.577 ms in length. Selected time slots in selected frames are used as control channels to transmit and receive packet control signaling, while the remaining time slots serve as traffic channels to transmit and receive user data, i.e., voice or packet data.

Base station timing for all bases stations 12 is synchronized so that all base stations 12 use the same frame and hyper-frame timing. Inter base station synchronization makes it possible to create time groups. Time groups are used to create a time reuse pattern on top of the frequency reuse pattern to create a higher effective reuse for certain control channels. Time groups are not typically employed for traffic channels.

In the exemplary embodiment described herein, four time groups are defined but one may chose not to use all of them. Each sector is assigned to one time group. The time groups are arranged in a ¼ reuse pattern, as shown in FIG. 2. To avoid adjacent channel interference, adjacent sectors are assigned to different time groups.

Within each time group, selected time slots in selected frames are used to transmit packet control signaling as shown in FIG. 3. The time slots chosen for packet control signaling in each time group are different. For example, time group 1 may use slot 1 for packet control signaling, time group 2 may use slot 3, time group 3 may use slot 5, and time group 4 may use slot 7. In blocks when one sector belonging to one time group transmits or receives packet control signaling, the sectors belonging to the other time groups are idle, i.e. are silent on both the uplink and downlink. The superimposition of the time reuse pattern on top of the frequency reuse pattern creates a higher effective reuse pattern for packet control signaling.

FIGS. 4A–4D illustrates the EDGE Compact Frame Structure, which is used in the exemplary embodiment described herein. The frame structure is based on a matrix with 52 rows and 8 columns, where columns represent time slots and rows represent succeeding frames in a 52-frame multi-frame. Time slot mapping is carried out such that broadcast channel (BCCH), common control channel (CCCH), Frequency Correction Channel (FCCH), and Synchronization Channel (SCH) of a certain time group rotate their time slot position over odd-numbered time slots. Only the FCCH, SCH, BCCH and CCCH rotate their time slot position from one multi-frame to the next. The traffic channels do not rotate their time slot position. The rotation occurs once a multi-frame between frames 4 and 5. The pattern of rotation will therefore repeat itself every four multi-frames creating a 208 multi-frame pattern. If the sequence number of a 52-frame multi-frame is denoted as N, then the four different rotation possibilities (0, 1, 2, and 3) is given as N MOD 4.

The rotation patterns for all four time groups are offset so that at any given time each time group employs a different rotation as shown in FIGS. 4A–4D. Thus, in blocks where time group 1 is transmitting packet control signaling, time groups 2, 3 and 4 are idle. Similarly, in blocks where time group 2 is transmitting packet control signaling, time groups 1, 3 and 4 are idle; in blocks where time group 3 is transmitting packet control signaling, time groups 1, 2 and 4 are idle; and in blocks where time group 4 is transmitting packet control signaling, time groups 1, 2 and 3 are idle. The multi-frame structure for EDGE Compact is described in greater detail in "Multiplexing and Multiple Access on the Radio Path," GSM 05.02, published by the European Telecommunications Institute (ETSI), which is incorporated herein by reference.

As seen in FIGS. 4A–4D, time group 1 transmits the BCCH in time slot 1 during rotation 1. Time group 2 transmits the BCCH during time slot 3, time group 3 transmits the BCCH during time slot 5, and time group 4 transmits the BCCH during time slot 7. During the next multi-frame or rotation, each time group shifts its transmit slot two slots right so that time group 1 transmits the BCCH on time slot 3. Time groups 2 and 3 likewise shift right by two time slots. Time group 4 rotates circularly from time slot 7 to time slot 1. This rotation occurs each multi-frame and repeats every four multi-frames.

In conventional wireless communications systems, carriers with broadcast and control channel information are broadcast continuously with constant power. At power-up, the mobile terminal 100 can locate a control channel by performing power measurements on the available carriers and selecting as candidates those with the highest power levels. The channel selection procedures for EDGE Classic are specified in "Radio subsystem control," GSM 05.08 v. 8.5.0, Release 1999, and "Functions related to Mobile Station in idle mode and group receive mode," GSM 03.22 v. 8.3.0, Release 1999, which are incorporated herein by reference. In EDGE Compact systems, however, packet control signaling is not transmitted continuously. Instead, packet control signaling is transmitted in selected time slots on carriers that also carry traffic, as shown in FIGS. 4A–4D. While certain control channels are transmitted at constant power, which is typically maximum power, the power level on the traffic channel is constantly varying. For purposes of further explanation, the control channels transmitted at constant power are referred to herein as power reference channels. The power reference channels in the exemplary embodiment comprise the BCCH, CCCH, SCH, or FCCH. These are the channels on which a valid power measurement may be taken.

The discontinuous transmission of packet control signaling makes power measurement during a power-up more difficult. If a power measurement is made over a short period of time, for example a few frames, there is no guarantee that the measurement would be at a time when the base station is transmitting at maximum power (i.e., during a BCCH, CCCH, SCH, or FCCH). The mobile terminal 100 could perform a series of power measurements on each carrier over a period of about twenty-six frames, in which case the mobile terminal 100 would be assured of obtaining at least one valid power measurement of a power reference channel. This method, however, would require a relatively long period of time to complete, particularly if there are a large number of available carriers. The present invention provides a method of performing power measurements in a more time efficient manner so that the mobile terminal 100 can select an EDGE Compact primary carrier and acquire service with the wireless communications system 10 more quickly.

According to the present invention, the mobile terminal 100 performs power measurements on each carrier in one or more frequency bands of interest. First, the mobile terminal 100 divides the total number of carriers, denoted as $N_t$, into groups of $N_c$ carriers. Note that the number of carriers in a group need not divide evenly into the total number of carriers. Some or all groups may use dummy carriers if that group has less than $N_c$ carriers. Alternatively, some carriers may be included in more than one group to ensure that each group has $N_c$ carriers. Second, after dividing the carriers into groups, the mobile terminal 100 performs a sequence of repetitive power measurements in a manner described below to ensure that a predetermined number of valid power measurements are obtained for each carrier. A valid power measurement is one which is obtained while a power reference channel (e.g., BCCH, CCCH) is being transmitted. Third, after obtaining power measurements for all carrier frequencies in all groups, the mobile terminal 100 averages a selected number of the power measurements with the highest values to obtain an average maximum power value for each carrier frequency. Fourth, a selected number of the carrier frequencies are selected as candidate carriers. The selected carriers are those with the highest average maximum power value.

According to the present invention, a sliding power measurement window is used to perform the repetitive power measurements on a plurality of carriers. The power measurement window comprises one frame of a TDMA multi-frame plus one slot. In EDGE Compact systems, a multi-frame comprises fifty-two frames, and each frame comprises eight slots. Therefore, the sliding power measurement window in EDGE Compact systems would be a total of nine slots. For each carrier group, repetitive power measurements are made on each carrier in the group in m successive instances of the sliding power measurement window. For purposes of this application, m successive instances of the power measurement window is referred to as a power measurement set. In each power measurement window, only one power measurement is made on each carrier in the group of carriers. The sequence of power measurements are repeated in m successive instances of the sliding power measurement window. In one exemplary embodiment, the power measurements are repeated over twenty-six frames, which equates to twenty-three power measurements on each carrier. This repetition gives an 89% probability of at least one power measurement on each carrier coinciding with a power reference channel.

After twenty-six frames, there will be a set twenty-three power measurements for each carrier. The highest power measurement from each power measurement set is taken as a valid power measurement. In fact, however, there is a small probability that the highest power measurement on a given carrier is not valid. The entire process is then repeated five (130 frames) or six (156 frames) times to obtain five or six presumably valid power measurements for each carrier. There is still a small probability that one power measurement on a given carrier is not valid, even though it is the highest power measurement on the carrier within a power measurement set. Therefore, to obtain an average power measurement for each carrier, one or more of the saved power measurements can be omitted from the calculation of an average power measurement. Assuming five independent power measurements are obtained on each carrier over five measurement sets, there is a 90% probability that four of such power measurements will coincide with a power reference channel. Assuming six independent measurements are obtained on each carrier over six power measurement sets, there is an 87% probability that five of such measurements will coincide with a power reference channel, and a 98% probability that four of such power measurements will coincide with a power reference channel. As described above, the average power measurement is then used to select candidate carriers.

FIG. 5 illustrates one example of the channel selection method according to the present invention. FIG. 5 illustrates one multi-frame in an EDGE Compact system. For purposes of this example, it is assumed that power measurements are taken on nine carriers during each sliding power measurement window. The nine carriers are designated as carriers A-I. The time slots in FIG. 5 with letters indicate slots where power measurements are obtained. The shaded slots in the figure represent slots where a valid power measurement is obtained. In this example, a total of twenty-three power measurements are made on each carrier spanning approximately twenty-six frames to complete one power measurement set. The first power measurement on carrier A occurs at frame 14, slot 2. Each successive power measurement on the same carrier shifts forward one slot position in modulo fashion (i.e., the next power measurement window). When the last slot in a frame is reached, a circular shift is made to the first slot two frames later. Stated another way, the power measurements on a given carrier are spaced nine slots apart, which is the length of a power measurement window. Power measurements on a given carrier always occur in the same relative position in each successive power measurement window. Thus, for example, the power measurement for carrier A always occurs in the first slot of a power measurement window and the power measurement for carrier C always occurs in the third slot of a power measurement window. Note in FIG. 5 that a valid power measurement is obtained on eight of the nine carriers.

FIG. 5 illustrates one power measurement set, which equals approximately twenty-six frames. A total of twenty-three measurements are obtained on each carrier. The highest measurement on each carrier is taken as a valid measurement for that set. The process is then repeated over five or six power measurement sets to obtain five or six independent measurements for each carrier. After each set of power measurements (every 26 frames), the power measurements may be re-started at a random position, rather than at the next available slot. Starting each power measurement set at a random slot in the frame may decrease the chance of failing to obtain a valid measurement.

Figure 6:
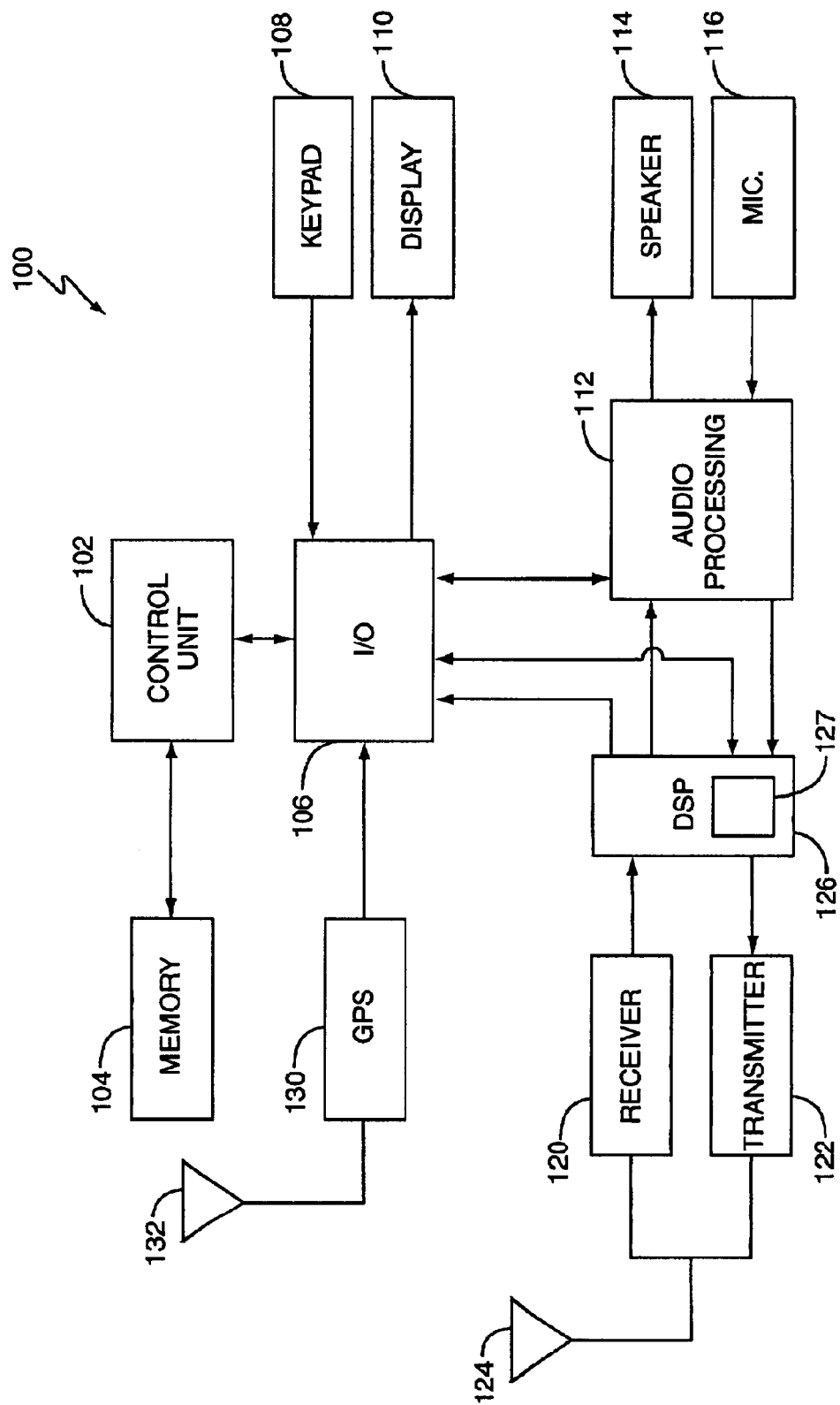
FIG. 6 is a block diagram of an exemplary mobile terminal that implements the channel selection method of the present invention.

FIG. 6 is a block diagram of an exemplary typical mobile terminal 100 that implements the channel selection method of the present invention. As used herein, the term mobile terminal 100 means any device capable of wireless communications. A mobile terminal 100 may, for example comprise a cellular radiotelephone, a personal communications terminal that combines a cellular radiotelephone with data processing capabilities, such as a Personal Communication System (PCS) device or Personal Digital Assistant (PDA), or a portable computing device, such as laptop computer or palm top computer, equipped with a radiotelephone. Mobile terminals 100 may also be referred to as "pervasive computing" devices.

The mobile terminal 100 includes a main control unit 102 for controlling the operation of the mobile terminal 100 and a memory 104 for storing control programs and data used by the mobile terminal 100 during operation. Input/output circuits 106 interface the main control unit 102 with a keypad 108 or other user input device, display 110, audio processing circuits 112, receiver 120, and transmitter 122. The keypad 108 allows the operator to dial numbers, enter commands, and select options. The display 110 allows the operator to see dialed digits, stored information, and call status information. The audio processing circuits 112 provide basic analog audio outputs to a speaker 114 and accept analog audio inputs from a microphone 116. The receiver 120 and transmitter 122 receive and transmit signals using shared antenna 124. Digital signal processing (DSP) circuits 126 process signals transmitted and received by the mobile terminal 100. The DSP circuits 126 include power measurement circuits 127 to determine the strength of signals received by the mobile terminal 100. The mobile terminal 100 may further comprise a GPS receiver 130 or other type of positioning receiver. The GPS receiver 130 enables the mobile terminal 100 to determine its current location based on positioning signals transmitted by a GPS satellite. In the disclosed embodiment, the GPS receiver 130 includes a separate antenna 132, however, the GPS receiver 130, the receiver 120, and transmitter 122 could use a shared antenna.

The main control unit 102 implements the communication protocols used by the mobile terminal 100. The communication protocol specifies timing, multiple access approach, modulation format, frame structure, power level, as well as many other aspects of mobile terminal operation. The main control unit 102 inserts signaling messages into the transmitted signals and extracts signaling messages from the received signals. Main control unit 102 acts on signaling messages received from the base station 12 as set forth in the communication protocol.

Figure 7:
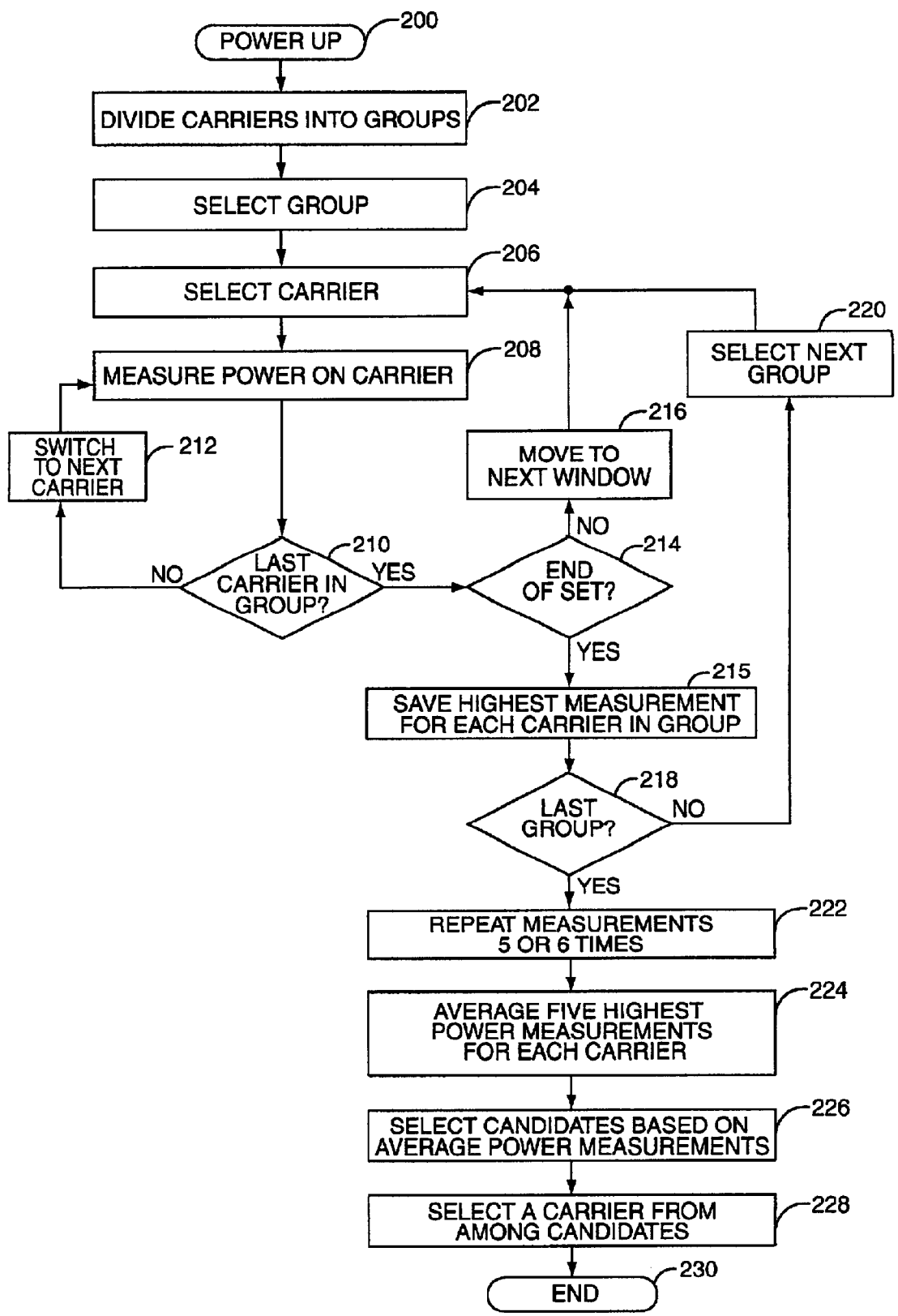
FIG. 7 is a flow chart illustrating the channel selection procedure according to the present invention.

FIG. 7 is a flow chart illustrating an exemplary channel selection procedure according to the present invention. The channel selection procedure of FIG. 7 begins when the mobile terminal 100 is powered on (block 200). The purpose of the channel selection procedure is to enable the mobile terminal to locate a channel on which to acquire service. After powering on (block 200), the mobile terminal 100 divides the available carriers into groups of $N_c$ carriers per group (block 202). The mobile terminal 100 then selects a first group of carriers (block 204) and a first carrier in the selected group (block 206) to begin power measurements. At block 208, the mobile terminal 100 measures power on the selected carrier. The power measurement obtained may be taken over multiple signal samples. After performing the power measurement in step 208, the mobile terminal 100 determines whether it has reached the last carrier in the group (block 210). If not, the mobile terminal 100 switches to the next carrier in the group (block 212) and obtains a power measurement on the newly selected carrier (block 208). This process repeats until the last carrier in the group is reached. Once the last carrier in the group is reached, the mobile terminal 100 determines whether the last power measurement window has been reached (block 214), which is the end of a power measurement set. If not, the mobile terminal 100 moves to the next power measurement window (block 216) and repeats the power measurements on each carrier in the next power measurement window. Decision block 214 ensures that the mobile terminal 100 repeats the power measurements on each carrier in the group a predetermined number of times in each power measurement set. In the embodiment described herein, the power measurement set comprises twenty-three repetitions. After completing the specified number of repetitions, the mobile terminal 100 saves the highest measurement for each carrier (block 215) and then determines whether the currently-selected group is the last group (block 218). If not, the mobile terminal 100 selects the next group of carriers (block 220). The mobile terminal 100 selects an initial carrier in the newly selected group (block 206) and begins performing power measurements (block 208). The mobile terminal 100 repeats the power measurements (block 208) on each carrier in the newly selected group over a sliding power measurement window as described above until the final power measurement window in the final group is reached. This entire process is then repeated five or six times (block 222) to obtain five or six power measurements for each carrier.

Once the mobile terminal 100 completes the power measurements on all carriers in all groups five or six times, the mobile terminal 100 then averages a specified number (e.g., five) of the highest power measurements for each carrier to obtain an average power for each carrier (block 224). This is done for the purpose of alleviating Rayleigh fading effects, which are common in radio channels. By averaging power values spaced in time, the fading effects are averaged out. The mobile terminal 100 then selects one or more candidate carriers (block 226) based on the average power of the carriers.

Eventually, the mobile terminal 100 selects one carrier from among the candidate carriers on which to acquire service (block 228). The details of how the final selection is made are well known in the art and are not material to the present invention. The final selection criteria is typically dependent upon the particular service provider. In general, the service provider programs the mobile terminal 100 to select those carriers which it most prefers from among the available candidate carriers. If one of the carriers is the home carrier for the mobile terminal 100, that carrier will typically be selected provided that quality of service requirements are met. The remaining carriers are divided into classes based on the preference of the service provider.

Once a carrier is selected, the mobile terminal 100 attempts to acquire service on the carrier. The mobile terminal 100 typically locks on to the Frequency Correction Channel (FCH) to obtain coarse information about timing and frequency offset. It then locks on the Synchronization Channel (SCH), which occurs at a fixed time offset away from the FCH, and obtains information regarding the position of the BCCH. It then reads the BCCH and is ready to register to the system. After registering, the mobile terminal 100 enters the camping state on the selected control channel. The channel selection procedure terminates when the mobile terminal enters the camping state on a selected carrier (block 230).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of performing power measurements on a TDMA carrier to find a discontinuous control channel in a wireless communication system, said method comprising:
   selecting a carrier with a discontinuous control channel;
   performing a plurality of repetitive power measurements on said carrier beginning with a first power measurement and continuing for a predetermined number of succeeding power measurements;
   said first power measurement taken in a first slot position in a first frame of a TDMA multi-frame; and
   each said succeeding power measurement occurring in a frame subsequent to a preceding power measurement and shifting forward one slot position in modulo fashion relative to said preceding power measurement.

2. The method of claim 1 wherein said frame comprises n slots, and wherein shifting forward one slot position in modulo fashion relative to a preceding power measurement comprises shifting forward one slot modulo n+1.

3. The method of claim 1 wherein performing a plurality of power measurements on said carrier beginning with a first power measurement and continuing for a predetermined number of succeeding power measurements comprises performing said power measurements for a period of 26 frames to complete one power measurement set.

4. The method of claim 1 wherein performing a plurality of power measurements on said carrier beginning with a first power measurement and continuing for a predetermined number of succeeding power measurements comprises performing said power measurements over at least five power measurement sets.

5. The method of claim 4 further comprising saving a maximum power measurement from said plurality of power measurements for each power measurement set.

6. The method of claim 5 further comprising selecting a predetermined number of said maximum power measurements with the highest values and averaging said selected maximum power measurements to obtain an average power for said carrier.

7. The method of claim 6 wherein selecting a predetermined number of said maximum power measurements with the highest values comprises selecting at least four of said maximum power measurements with the highest values.

8. The method of claim 6 wherein selecting a predetermined number of said maximum power measurements with the highest values comprises selecting at least five of said maximum power measurements with the highest values.

9. The method of claim 1 wherein s a id wireless communications system is an EGDE Compact system.

10. A method of scanning a plurality of carriers in a wireless communications system, said method comprising:
    defining a sliding power measurement window comprising one frame plus one slot in a TDMA multi-frame, said TDMA multi-frame comprising a plurality of frames and a plurality of slots in each frame;
    performing a plurality of repetitive power measurements on said plurality of carriers over a plurality of successive sliding power measurement windows;
    said repetitive power measurements on each said carrier taken at the same relative position in each said sliding power measurement window, such that each successive power measurement on each carrier shifts forward one slot position in a modulo fashion.

11. The method of claim 10 wherein performing a plurality of repetitive power measurements on a plurality of carriers over a plurality of successive power measurements windows comprises performing a single power measurement on each carrier in each power measurement window.

12. The method of claim 11 wherein performing a plurality of repetitive power measurements on a plurality of carriers over a plurality of successive power measurement windows comprises performing said repetitive power measurements over a period of at least 26 frames.

13. The method of claim 11 wherein performing a plurality of repetitive power measurements on a plurality of carriers over a plurality of successive power measurement windows comprises performing said repetitive power measurements over a period of at least 130 frames.

14. The method of claim 12 further comprising:
    selecting a predetermined number of power measurements with the highest values on each carrier;
    averaging said selected power measurements on each carrier to obtain an average power for each carrier; and
    selecting one or more candidate channels based on said average power measurements.

15. The method of claim 14 wherein selecting a predetermined number of power measurements with the highest values on each carrier comprises selecting at least four power measurements with the highest values.

16. The method of claim 14 wherein selecting a predetermined number of power measurements with the highest values on each carrier comprises selecting at least five power measurements with the highest values.

17. The method of claim 10 wherein said wireless communications system is an EDGE Compact system.

18. A channel selection method implemented in a mobile terminal to select a carrier from a plurality of available carriers in a wireless communications system, said method comprising:

dividing said available carriers into groups of carriers, each group of carriers comprising a plurality of carriers;

defining a power measurement window comprising one frame plus one slot of a TDMA multi-frame, said TDMA multi-frame comprising a plurality of frames and a plurality of slots in each frame;

for each group of carriers, performing a plurality of repetitive power measurements on each carrier in said group of carriers over a plurality of successive power measurements windows, said repetitive power measurements on each said carrier in said group of carriers taken at the same relative position in each said power measurement window, such that each successive power measurement on each carrier shifts forward one slot position in modulo fashion; and selecting a channel based on said power measurements.

19. The method of claim 18 wherein performing a plurality of repetitive power measurements on each carrier in said group of carriers over a plurality of successive power measurement windows comprises performing said repetitive power measurements over a period of at least 26 frames.

20. The method of claim 19 wherein performing a plurality of repetitive power measurements on each carrier in said group of carriers over a plurality of successive power measurement windows comprises performing said repetitive power measurements over a period of at least 130 frames.

21. The method of claim 20 wherein selecting a channel based on said power measurements comprises:

selecting a predetermined number of power measurements with the highest values on each carrier in each group of carriers;

averaging said selected power measurements on each carrier in each group of carriers to obtain an average power for each carrier; and selecting one or more candidate channels based on said average power measurements.

22. The method of claim 21 wherein selecting a predetermined number of power measurements with the highest values on each carrier in each group of carriers comprises selecting at least four power measurements with the highest values.

23. The method of claim 21 wherein selecting a predetermined number of power measurements with the highest values on each carrier in each group of carriers comprises selecting at least five power measurements with the highest values.

24. The method of claim 18 wherein said wireless communications system is an EDGE Compact system.

25. A wireless communication mobile terminal comprising:

a receiver to receive signals on a plurality of carriers;

a power measurement circuit operatively connected to said receiver to measure the power of signals received on said plurality of carriers, wherein said power measurement circuit performs a plurality of repetitive power measurements on each of said plurality of carriers over a plurality of successive power measurement windows, said repetitive power measurements on each said carrier taken at the same relative position in each said power measurement windows; and control logic to control the operation of said power measurement circuit and to select a channel based on said power measurements made by said power measurement circuit.

26. The mobile terminal of claim 25 wherein said repetitive power measurements are made over a period of at least 26 frames.

27. The mobile terminal of claim 26 wherein said repetitive power measurements are made over a period of at least 130 frames.

28. The mobile terminal of claim 27 wherein said control unit averages a selected number of power measurements with the highest values on each carrier to obtain an average power for each carrier and selects one or more candidate channels based thereon.

29. The mobile terminal of claim 28 wherein said control unit averages the four highest power measurements on each carrier.

30. The mobile terminal of claim 28 wherein said control unit averages the five highest power measurements on each carrier.

* * * * *